United States Patent
Lackner

(10) Patent No.: US 9,283,510 B2
(45) Date of Patent: Mar. 15, 2016

(54) METHOD FOR PRODUCING A MOISTURE SWING SORBENT FOR CARBON DIOXIDE CAPTURE FROM AIR

(75) Inventor: Klaus S. Lackner, Dobbs Ferry, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 165 days.

(21) Appl. No.: 14/240,053

(22) PCT Filed: Aug. 21, 2012

(86) PCT No.: PCT/US2012/051717
§ 371 (c)(1),
(2), (4) Date: Jun. 17, 2014

(87) PCT Pub. No.: WO2013/028688
PCT Pub. Date: Feb. 28, 2013

(65) Prior Publication Data
US 2014/0356275 A1    Dec. 4, 2014

Related U.S. Application Data

(60) Provisional application No. 61/526,063, filed on Aug. 22, 2011.

(51) Int. Cl.
*B01J 20/26* (2006.01)
*B01D 53/02* (2006.01)
*B01J 41/04* (2006.01)
*B01J 49/00* (2006.01)
*B01D 53/047* (2006.01)

(52) U.S. Cl.
CPC .............. *B01D 53/025* (2013.01); *B01D 53/02* (2013.01); *B01J 41/04* (2013.01); *B01J 49/0073* (2013.01); *B01D 53/047* (2013.01); *B01D 2253/202* (2013.01); *B01D 2253/206* (2013.01); *B01D 2253/25* (2013.01); *B01D 2257/504* (2013.01); *B01D 2258/06* (2013.01); *B01D 2259/40086* (2013.01); *Y02C 10/08* (2013.01)

(58) Field of Classification Search
CPC ............ B01J 20/26; B01J 20/22; B01J 20/00; B01J 38/48; B01J 38/70; B01J 38/60
USPC ............ 502/402, 401, 404, 526, 514, 22, 23, 502/27, 56, 439; 95/139
See application file for complete search history.

(56) References Cited

U.S. PATENT DOCUMENTS

| | | |
|---|---|---|
| 3,134,697 A | 5/1964 | Niedrach |
| 4,107,098 A | 8/1978 | Tamura et al. |
| 5,797,979 A | 8/1998 | Quinn |
| 6,338,784 B1 | 1/2002 | Terada et al. |
| 7,635,062 B2 | 12/2009 | Klare et al. |
| 2002/0043484 A1 | 4/2002 | Khare |
| 2009/0232861 A1 | 9/2009 | Wright et al. |
| 2011/0081710 A1 | 4/2011 | Wright et al. |

FOREIGN PATENT DOCUMENTS

WO    2010022399 A1    2/2010

OTHER PUBLICATIONS

SnowPure Excellion Ion Exchange Membranes, Excellion Division, SnowPure LLC, Aug. 2009.
International Search Report and The Written Opinion of the International Searching Authority, International Application No. PCT/US2012/051717, filed Oct. 26, 2012.

*Primary Examiner* — Edward Johnson
(74) *Attorney, Agent, or Firm* — Wiggin and Dana LLP; Anthony P. Gangemi

(57) ABSTRACT

Methods and systems for producing a moisture swing sorbent for carbon dioxide capture from air are disclosed. In some embodiments, the methods include the following: providing a heterogeneous ion-exchange material; soaking the material in deionized water; washing the material in hydroxide or carbonate solutions; rinsing the material in deionized water; collecting and titrating residuals of the soaking and the washing steps into a residual solution; measuring an amount of chloride in the residual solution; repeating all of the steps if the amount of chloride measured in the residual solution is greater than zero; and drying the material with either dry nitrogen gas or air free of carbon dioxide and water.

14 Claims, 4 Drawing Sheets

METHOD FOR PRODUCING A MOISTURE SWING SORBENT FOR CARBON DIOXIDE CAPTURE FROM AIR

CROSS REFERENCE TO RELATED APPLICATION(S)

This application claims the benefit of U.S. Provisional Application No. 61/526,063, filed Aug. 22, 2011, which is incorporated by reference as if disclosed herein in its entirety.

BACKGROUND

Current carbon capture and storage (CCS) techniques focus on capture from large point sources. According to the Intergovernmental Panel on Climate Change (IPCC) report, about 60 percent of global carbon dioxide emissions from fossil-fuels are attributed to large stationary sources. Assuming 90 percent capture efficiency and 90 percent coverage of all sources, about 50 percent of global emissions would still be released into the atmosphere. This is far too much to allow for the stabilization of the atmospheric concentration of carbon dioxide and insufficient to constrain the growth of atmospheric carbon dioxide concentrations as the world economy grows.

Direct capture of carbon dioxide from ambient air was first suggested by Lackner et al. in 1999 as a method to counteract global warming. Energy requirement and cost analysis studies claim that air capture is feasible and economically viable. At the same time, the uncertainty in economic assessments for future air capture implementation is significant, considering technique and market development. Success will depend on a more energy efficient sorbent cycle.

SUMMARY

Aspects of the disclosed subject matter include methods and systems for producing a moisture swing sorbent for carbon dioxide capture from air and for regenerating a moisture swing sorbent for carbon dioxide capture from air.

Referring now to FIG. 1, in some embodiments, an amine-based anion exchange resin dispersed in a flat sheet of polypropylene is prepared in alkaline forms so that it captures carbon dioxide from air. The resin, with quaternary ammonium cations attached to the polymer structure and hydroxide or carbonate groups as mobile counterions, absorbs carbon dioxide when dry and releases it when wet. In ambient air, the moist resin dries spontaneously and subsequently absorbs carbon dioxide. This constitutes a moisture induced cycle, which stands in contrast to thermal pressure swing based cycles. The absorption and desorption process is described well by a Langmuir isothermal model. The equilibrium partial pressure of carbon dioxide over the resin at a given loading state can be increased significantly by wetting the resin.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Aspects of the disclosed subject matter include methods and systems for producing a moisture swing sorbent for carbon dioxide capture from air. Some embodiments include the use of a water swing at room temperature or a humidity swing at elevated temperatures to release the carbon dioxide capture by the sorbent. Typically, the loaded sorbent is wetted, e.g., either by submersion in water or increased humidity via spraying of water droplets, to release the carbon dioxide gas and the gas is collected via a vacuum. The carbon dioxide gas is then compressed to liquid form and the sorbent dried for re-use.

Figure 1:
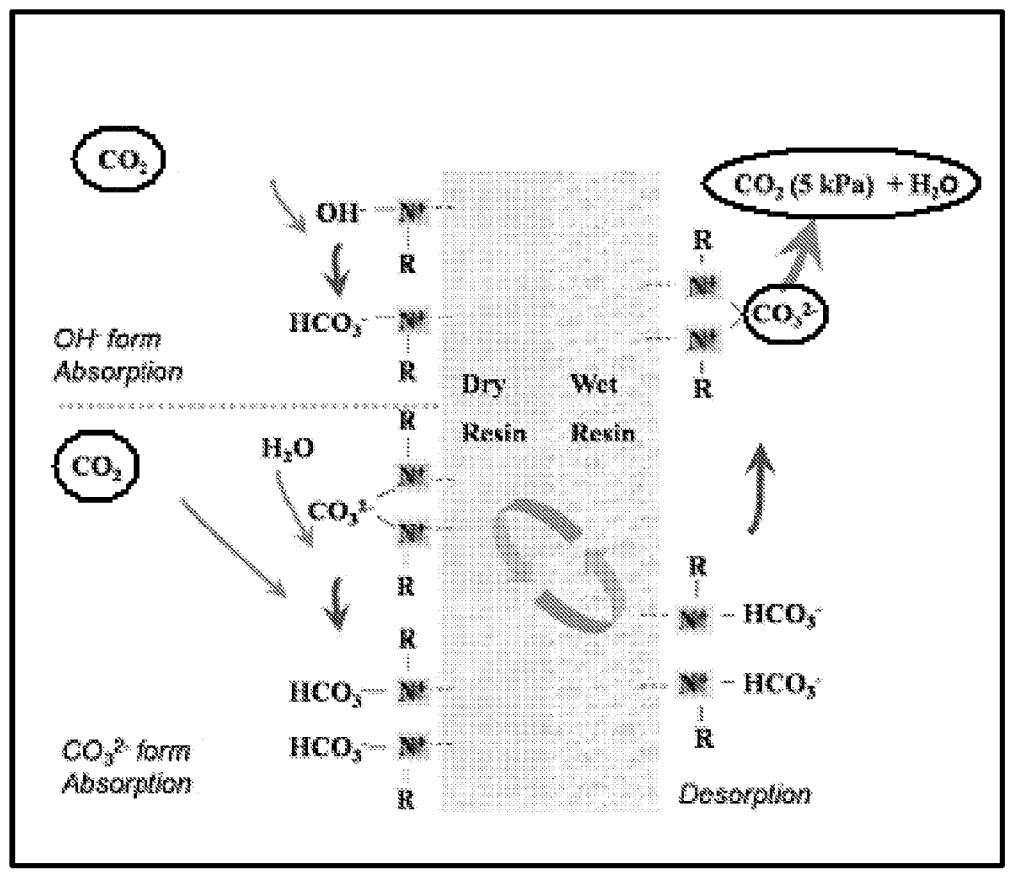
FIG. 1 is a schematic diagram of a moisture swing sorbent according to some embodiments of the disclosed subject matter.
Figure 2:
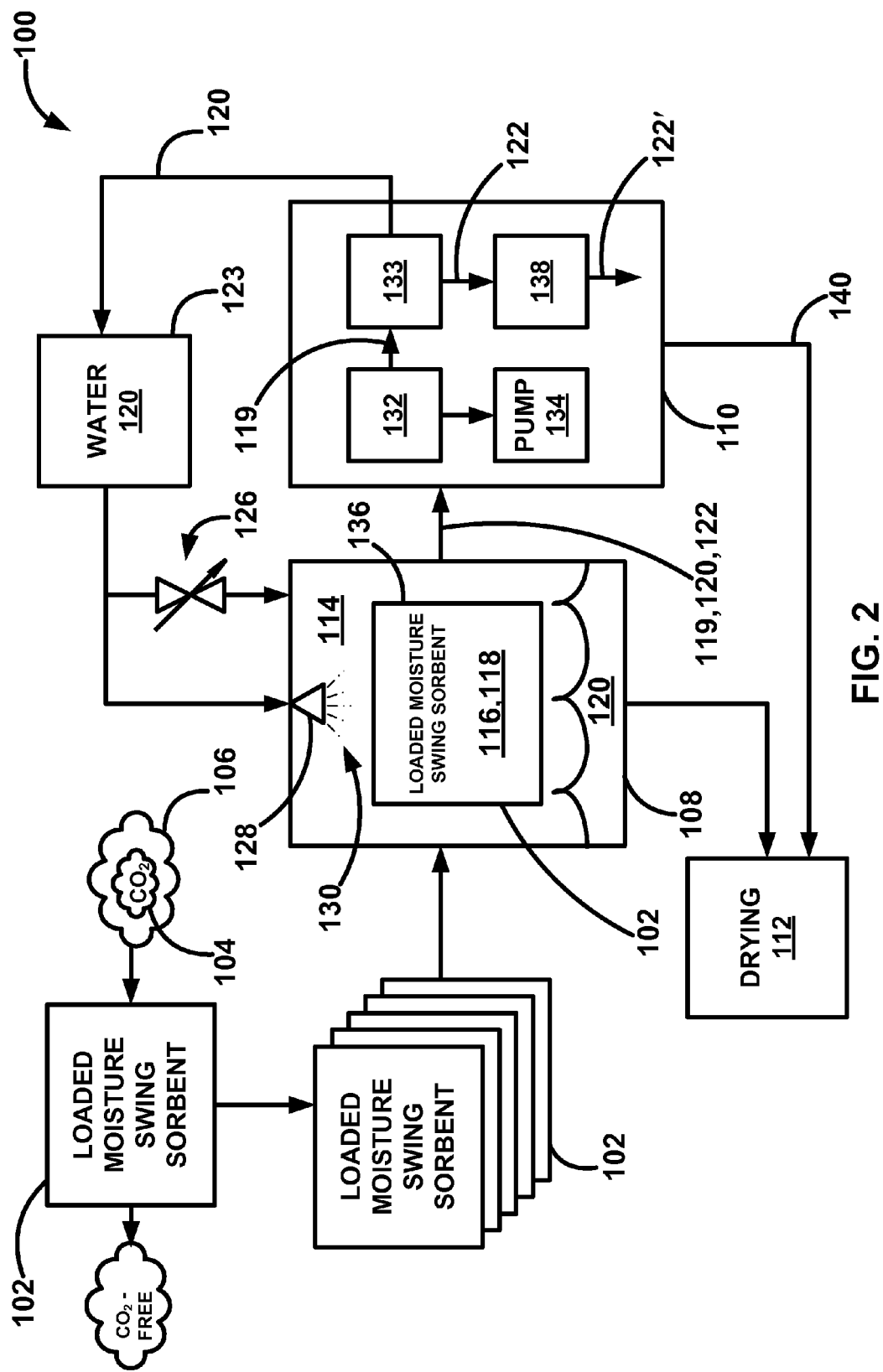
FIG. 2 is a schematic diagram of methods and systems according to some embodiments of the disclosed subject matter.

Referring now to FIG. 2, some embodiments include a system 100 for regenerating a moisture swing sorbent 102 for carbon dioxide 104 capture from air 106. System 100 includes a wetting module 108, a carbon dioxide collection module 110, and a drying chamber 112, all of which are in fluid communication with one another.

Wetting module 108 includes a wetting chamber 114 for wetting moisture swing sorbent 102, which is substantially dry and loaded with bicarbonate 116. Bicarbonate 116 is substantially formed with carbon dioxide 104 captured from air 106. Moisture swing sorbent 102 is typically wetted until bicarbonate 116 in the sorbent decomposes to carbonate 118 and a stream 119 including water 120 and carbon dioxide gas 122. Carbon dioxide gas 122 is substantially released from moisture swing sorbent 102. Wetting module 108 includes a supply 123 of water 120 in fluid connection with wetting chamber 114. In some embodiments, wetting module 108 includes a filling mechanism 126, e.g., a conduit and valve, to fill wetting chamber 114 with water 120. In some embodiments, wetting module 108 includes a spray mechanism 128 for spraying droplets 130 of water 120 on moisture swing sorbent 102, which is positioned in wetting chamber 114.

Carbon dioxide collection module 110 includes a vacuum chamber 132, a condenser 133 for removing water 120 from stream 119, a pump 134 for creating a vacuum on a side 136 of moisture swing sorbent 102 to pull carbon dioxide gas 122 released from the moisture swing sorbent out of wetting chamber 114, and a compressor 138 for compressing the carbon dioxide gas into a liquid form 122'. In some embodiments, vacuum chamber 132 does not cover all of moisture swing sorbent 102, e.g., it has a bubble-shaped cover (not shown) that only covers portions of the sorbent thus avoiding the need for a full vacuum chamber.

Drying chamber 112 dries moisture swing sorbent 102, which is substantially free of carbon dioxide 104 and bicarbonate 116. In some embodiments, spin drying is used to increase the amount of water 120 recovered from moisture swing sorbent 102. In some embodiments, a heat 140 generated by condenser 133 and compressor 138 is used to dry moisture swing sorbent 102.

In some embodiments, the carbon dioxide released from the sorbent is re-dissolved into a solvent on the other side of the sorbent, e.g., re-dissolved into a sodium carbonate solution for capture and quantification of amount captured. In some embodiments, a sweep gas that flows through the sorbent is used to capture and collect the carbon dioxide released from the sorbent. In some embodiments, a counter-stream design is used, i.e., carbon dioxide and water vapor are transferred from nearly depleted and heated sorbent to partially loaded sorbent and fully loaded sorbent, which leaves the sorbent more depleted and less wet. The carbon dioxide concentration increases until it exits from end of the freshest sorbent.

Figure 3:
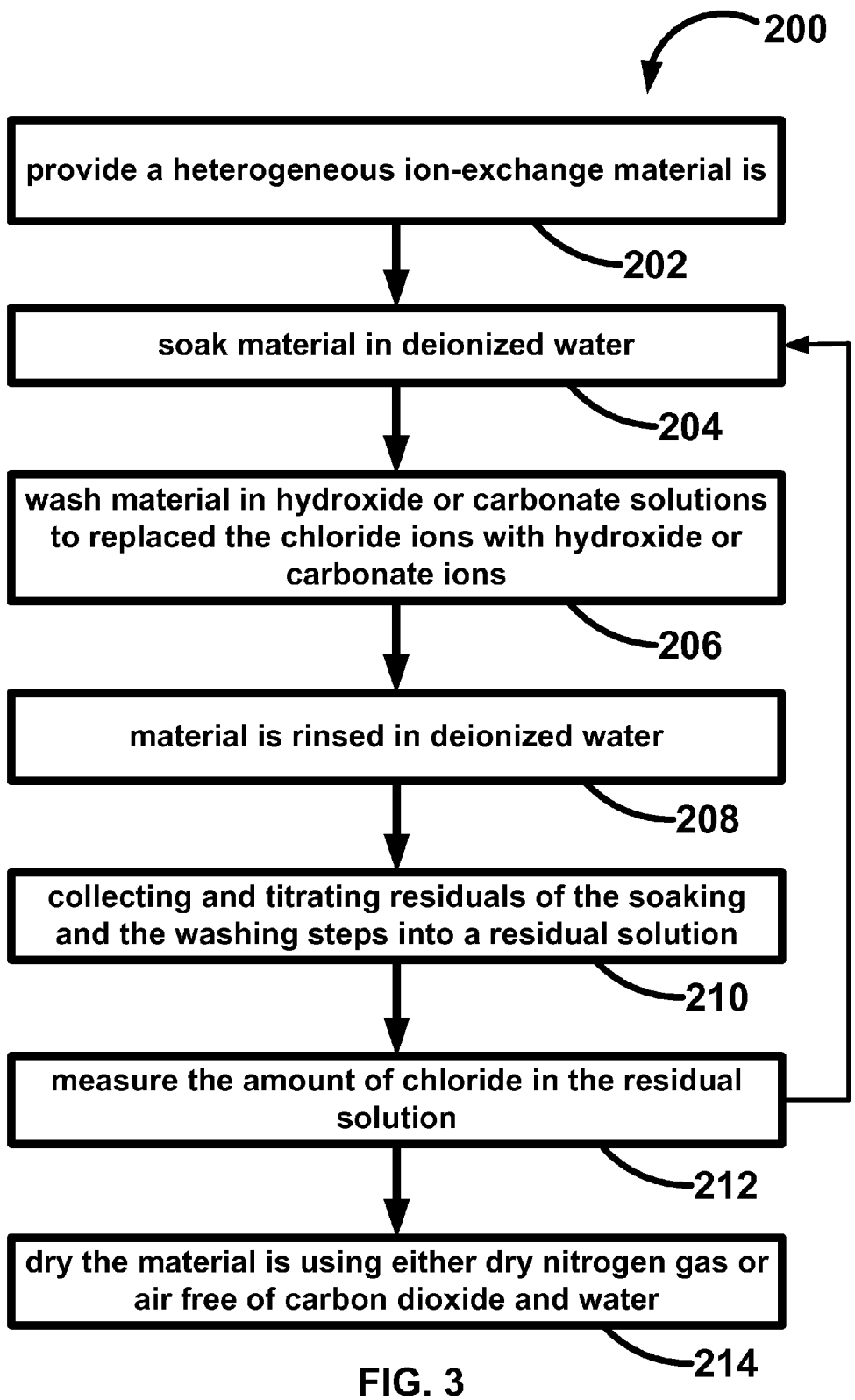
FIG. 3 is a chart of a method according to some embodiments of the disclosed subject matter.

Referring now to FIG. 3, some embodiments include a method 200 for producing a moisture swing sorbent for carbon dioxide capture from air.

At 202, a heterogeneous ion-exchange material is provided. In some embodiments, the original exchangeable anions of the material are chloride ions. In some embodiments, the material has a thickness of about 0.1 to about 1.5 millimeters and is a co-extruded sheet that includes a polymer matrix and a resin powder having quaternary ammonium functional groups. In some embodiments, the resin powder is about 50 to about 70 percent by weight of the sheet and includes resin particles having a size of about 20 μμm to about 60 μm. In some embodiments, the sheet has a surface area of about 2.0 square meters per gram and the surface area of the resin powder is about 400 times an apparent surface area of the sheet. In some embodiments, the sheet has a porous structure with pore sizes ranging from about 2 μm to about 50 μm and the porous structure includes spaces between the resin powder resin and the polymer matrix.

At 204, the material is soaked in deionized water. In some embodiments, the material is soaked for a period of about 24 to about 48 hours.

At 206, the material is washed in hydroxide or carbonate solutions to replace the chloride ions with hydroxide or carbonate ions. In some embodiments, the material is washed in one of a 1.0 M sodium hydroxide solution and a 0.5 M sodium carbonate solution.

At 208, the material is rinsed in deionized water. In some embodiments, the deionized water has a temperature of about 89 to about 95 degrees Celsius.

At 210, residuals of the soaking and the washing steps are collected and titrated into a residual solution. At 212, the amount of chloride in the residual solution is measured. Steps 202 thru 212 are repeated if the amount of chloride measured in the residual solution is greater than zero.

At 214, the material is dried using either dry nitrogen gas or air free of carbon dioxide and water.

Figure 4:
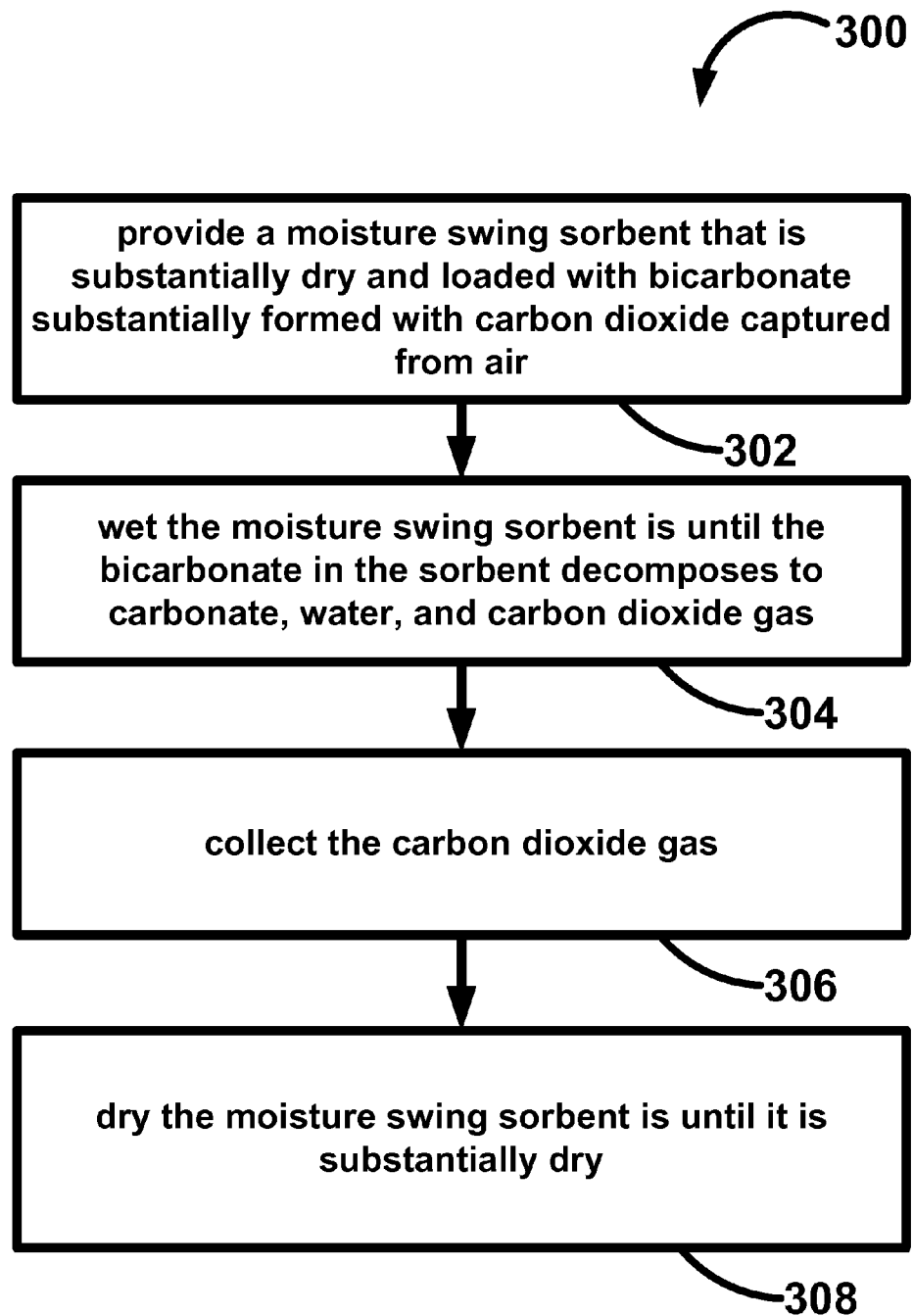
FIG. 4 is a chart of a method according to some embodiments of the disclosed subject matter.

Referring now to FIG. 4, some embodiments include a method 300 of regenerating a moisture swing sorbent for carbon dioxide capture from air. At 302, a moisture swing sorbent that is substantially dry and loaded with bicarbonate substantially formed with carbon dioxide captured from air is provided.

At 304, the moisture swing sorbent is wetted until the bicarbonate in the sorbent decomposes to carbonate, water, and carbon dioxide gas. When wetted, the carbon dioxide gas is substantially released from the sorbent.

At 306, the carbon dioxide gas is collected. In some embodiments, a vacuum is created to collect the carbon dioxide gas. In some embodiments, the collected carbon dioxide gas is compressed until it is in a liquid form.

At 308, the moisture swing sorbent is dried until it is substantially dry.

Moisture swing offers a new approach to regenerating carbon dioxide sorbents. It trades input of heat in a thermal swing, or mechanical energy in a pressure-based swing, against the consumption of water, whose evaporation provides the free energy that drives the cycle. Such an energy source as water is low in cost. Compared to water consumption in biomass production, water consumption in a moisture swing is orders of magnitude smaller. Moisture swing driven absorption cycles are of interest to air capture but also may prove of interest in other situations, as for example in capture from natural gas fired power plants.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method for producing a moisture swing sorbent for carbon dioxide capture from air, said method comprising:
   providing a heterogeneous ion-exchange material;
   soaking said material in deionized water;
   washing said material in hydroxide or carbonate solutions;
   rinsing said material in deionized water;
   collecting and titrating residuals of said soaking and said washing steps into a residual solution;
   measuring an amount of chloride in said residual solution;
   repeating all of said steps if said amount of chloride measured in said residual solution is greater than zero; and
   drying said material with either dry nitrogen gas or air free of carbon dioxide and water.

2. The method according to claim 1, wherein said deionized water has a temperature of about 89 to about 95 degrees Celsius.

3. The method according to claim 1, wherein said material is soaked in deionized period for a period of about 24 to about 48 hours.

4. The method according to claim 1, wherein said material has a thickness of about 0.1 to about 1.5 millimeters.

5. The method according to claim 1, wherein said material is washed in one of a 1.0 M sodium hydroxide solution and a 0.5 M sodium carbonate solution.

6. The method according to claim 1, wherein original exchangeable anions of said material are chloride ions.

7. The method according to claim 6, further comprising:
   replacing said chloride ions with hydroxide or carbonate ions.

8. The method according to claim 1, wherein said material is a co-extruded sheet that includes a polymer matrix and a resin powder having quaternary ammonium functional groups.

9. The method according to claim 8, wherein said resin powder is about 50 to about 70 percent by weight of said sheet.

10. The method according to claim 8, wherein said resin powder includes resin particles having a size of about 20 μm to about 60 μm.

11. The method according to claim 8, wherein said sheet has a surface area of about 2.0 square meters per gram.

12. The method according to claim 8, wherein a surface area of said resin powder is about 400 times an apparent surface area of said sheet.

13. The method according to claim 8, wherein said sheet has a porous structure with pore sizes ranging from about 2 μm to about 50 μm.

14. The method according to claim 13, wherein said porous structure includes spaces between said resin powder resin and said polymer matrix.

* * * * *